(12) United States Patent
Stevens (10) Patent No.: US 8,668,210 B2
(45) Date of Patent: Mar. 11, 2014

(54) WHEELBARROW CONFIGURATION

(76) Inventor: George W. Stevens, North Myrtle Beach, SC (US)

( * ) Notice: Subject to any disclaimer, the term of this patent is extended or adjusted under 35 U.S.C. 154(b) by 0 days.

(21) Appl. No.: 13/609,763

(22) Filed: Sep. 11, 2012

(65) Prior Publication Data

US 2013/0062844 A1    Mar. 14, 2013

Related U.S. Application Data

(60) Provisional application No. 61/573,722, filed on Sep. 12, 2011.

(51) Int. Cl.
*B62B 1/00* (2006.01)

(52) U.S. Cl.
USPC ..................... 280/47.26; 280/47.31

(58) Field of Classification Search
USPC ........ 280/47.26, 47.31, 47.131, 47.17, 47.24, 280/651, 652, 653, 38, 641, 645, 47.315; 298/2, 3, 17 SG
See application file for complete search history.

(56) References Cited

U.S. PATENT DOCUMENTS

| | | | |
|---|---|---|---|
| 1,479,223 A | 1/1924 | Carroll | |
| 1,497,478 A | 6/1924 | Bludworth | |
| 2,037,222 A * | 4/1936 | Farrar | 298/3 |
| 2,766,063 A | 10/1956 | Greeley | |
| 2,852,304 A | 9/1958 | Harrison | |
| 2,973,224 A | 2/1961 | Wall | |
| 3,092,418 A | 6/1963 | Themascus | |
| 3,685,674 A * | 8/1972 | Bruer et al. | 414/421 |
| 4,270,786 A | 6/1981 | Mattox | |
| 4,471,996 A | 9/1984 | Primeau | |
| 4,789,171 A * | 12/1988 | Porter | 280/47.18 |
| 5,121,970 A | 6/1992 | Andersen | |
| 5,350,030 A | 9/1994 | Mawhinney et al. | |
| 5,810,543 A | 9/1998 | Hall | |
| 5,924,708 A * | 7/1999 | Bisaillon et al. | 280/47.26 |
| 6,193,319 B1 * | 2/2001 | Kielinski | 298/2 |
| 6,220,622 B1 * | 4/2001 | Garcia | 280/653 |
| 6,755,478 B2 * | 6/2004 | Messinger-Rapport | 298/3 |
| 6,886,838 B1 * | 5/2005 | Zimmerman | 280/47.31 |
| 6,908,089 B1 | 6/2005 | Stark et al. | |
| 6,923,469 B2 | 8/2005 | Tomchak et al. | |
| 6,991,251 B2 * | 1/2006 | Tomchak et al. | 280/653 |
| 7,134,676 B2 | 11/2006 | Capers, Jr. et al. | |
| D544,173 S | 6/2007 | Mullen et al. | |
| 7,296,807 B2 * | 11/2007 | Zimmerman | 280/47.32 |
| 7,354,059 B2 | 4/2008 | Black | |
| 7,547,026 B2 * | 6/2009 | Morris | 280/47.31 |
| 7,775,531 B2 | 8/2010 | Zimmerman | |
| 7,934,728 B2 * | 5/2011 | Strobel | 280/47.21 |
| 2005/0275174 A1 | 12/2005 | Mullen et al. | |
| 2008/0084038 A1 * | 4/2008 | Byers | 280/47.34 |

* cited by examiner

*Primary Examiner* — Jeffrey J Restifo
*Assistant Examiner* — James M Dolak
(74) *Attorney, Agent, or Firm* — P. Jeff Martin; The Law Firm of P. Jeffrey Martin, LLC (57) ABSTRACT

Disclosed is a wheelbarrow that is easily moved and can be unloaded at either the front or rear end. One example embodiment of the wheelbarrow provides a frame and a container. A pivoting mechanism pivotally secures the container to the frame such that the container can be pivoted relative to the frame. A pair of handles is attached to the frame and a pair of wheels is coupled to the frame. A stabilizing assembly is coupled between the handles and the frame. The stabilizing assembly is selectively engaged during unloading of the wheelbarrow.

8 Claims, 6 Drawing Sheets

WHEELBARROW CONFIGURATION

RELATED APPLICATIONS

This application claims priority to U.S. Provisional Patent Application Ser. No. 61/573,722, filed on Sep. 12, 2011 and entitled, "Improved Wheelbarrow Configuration". The entire contents of which are herein incorporated by reference.

TECHNICAL FIELD OF THE INVENTION

Example embodiments of the invention are directed to an improved wheelbarrow that is easy to move and unload, and more particular, to an improved wheelbarrow that enables movement of the wheelbarrow without lifting and that allows unloading of the wheelbarrow contents from either end.

BACKGROUND OF THE INVENTION

Wheelbarrows have long been used to transport and carry objects or materials between or about locations. There are numerous wheelbarrow designs that are known. Unfortunately, the current wheelbarrows have drawbacks and limitations that require operators to have good physical strength and coordination in order to safely maneuver and unload the wheelbarrow without tipping.

A search of the prior art did not disclose any patents that read directly on the claims of the instant invention; however, the following references were considered related:

U.S. Patent Application no. 2005/0275174 published in the name of Mullen;
U.S. Pat. No. 7,775,531 issued in the name of Zimmerman;
U.S. Pat. No. 7,354,059 issued in the name of Black;
U.S. Pat. No. 7,134,676 issued in the name of Capers;
U.S. Pat. No. 6,923,469 issued in the name of Tomchak;
U.S. Pat. No. 6,908,089 issued in the name of Stark;
U.S. Pat. No. 5,810,543 issued in the name of Hall;
U.S. Pat. No. 5,350,030 issued in the name of Mawhinney;
U.S. Pat. No. 5,121,970 issued in the name of Andersen;
U.S. Pat. No. 4,471,996 issued in the name of Primeau;
U.S. Pat. No. 4,270,786 issued in the name of Mattox;
U.S. Pat. No. 3,092,418 issued in the name of Themascus;
U.S. Pat. No. 2,973,224 issued in the name of Wall;
U.S. Pat. No. 2,852,304 issued in the name of Harrison;
U.S. Pat. No. 2,766,063 issued in the name of Greeley;
U.S. Pat. No. 1,497,478 issued in the name of Bludworth;
U.S. Pat. No. 1,479,223 issued in the name of Carroll; and
U.S. Pat. No. D544,173 issued in the name of Mullen.

SUMMARY OF THE INVENTION

One example embodiment of the wheelbarrow provides a frame and a container. A pivoting mechanism pivotally secures the container to the frame such that the container can be pivoted relative to the frame. A pair of handles is attached to the frame and a pair of wheels is coupled to the frame. A stabilizing assembly is coupled between the handles and the frame. The stabilizing assembly is selectively engaged during unloading of the wheelbarrow.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of an apparatus and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Example embodiments provide a wheelbarrow that is easily moved by a user and that can be unloaded at either the front end or the rear end of the wheelbarrow. The wheelbarrow can be raised to controlled heights and unloading angles. The wheelbarrow includes a frame that has an attached container. A pivoting mechanism pivotally secures the container to the frame such that the container can be pivoted relative to the frame. Two spaced apart handles are attached to the frame and two wheels are mounted to the frame. A stabilizing assembly is coupled between the handles and the frame. The stabilizing assembly can selectively be engaged during unloading of the wheelbarrow. Several different container embodiments are also disclosed.

Figures 1, 2:
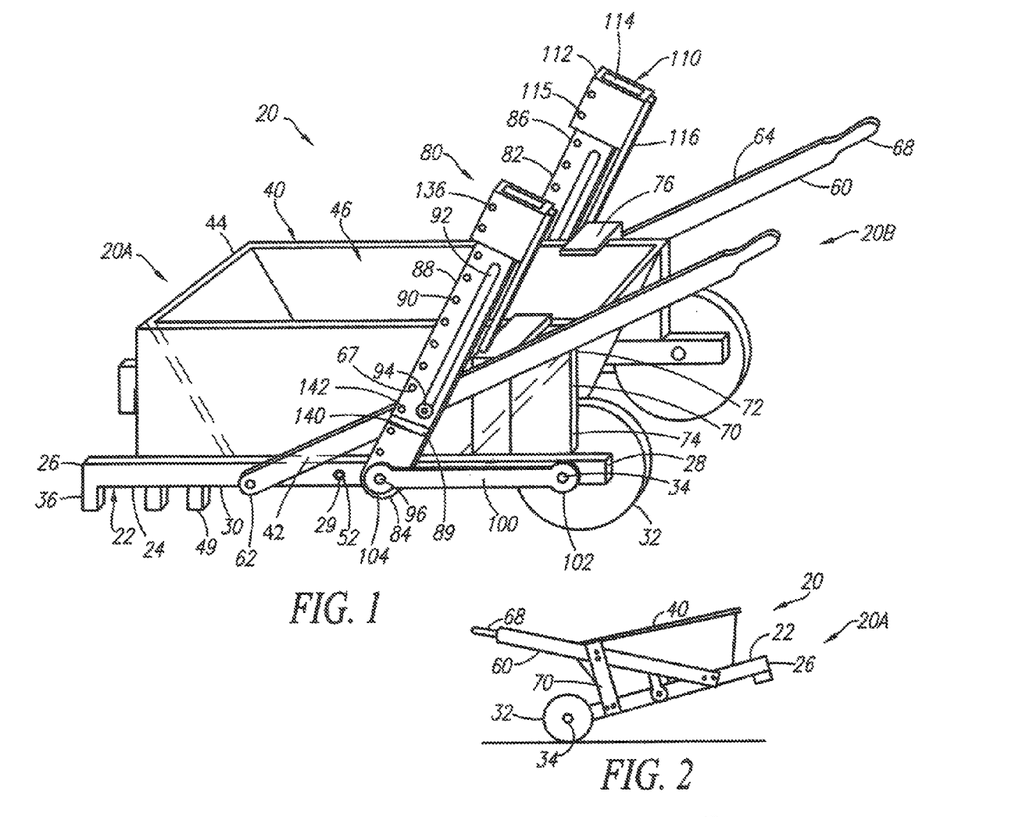
FIG. 1 illustrates a perspective view of an example wheelbarrow in a loading position according to example embodiments.
FIG. 2 illustrates a side view of the wheelbarrow of FIG. 1 in a raised position for transporting according to example embodiments.

FIG. 1 illustrates an example wheelbarrow in a loading position according to example embodiments. Referring to FIG. 1, a wheelbarrow 20 has a front end 20A and a rear or operator end 20B. Wheelbarrow 20 includes a frame 22 with two elongated spaced apart rails 24. Each of the rails 24 has a distal end 26, a proximal end 28 and a center section 30. An aperture 29 extends through center section 30. A wheel 32 is attached to an axle 34 that is mounted through an aperture in each rail proximal end 28. Wheels 32 can rotate about axles 34. Foot supports 36 extend downward from rail distal end 26. Foot supports 36 keep the wheelbarrow in substantially a horizontal orientation when the wheelbarrow is not being moved. Wheelbarrow 20 can be formed from suitable materials such as steel, wood, injection molded plastic or a combination of materials.

A container 40 is mounted to frame 22. Container 40 can hold a wide variety of materials to be transported such as concrete, dirt, building materials and other materials. With additional reference to FIGS. 14A and 14B, container 40 is formed from a planar bottom panel 42 and four generally planar panels 44. Panels 42 and 44 are connected to each other and define a cavity 46. Container 40 can be formed from suitable materials such as steel or injection molded plastic.

Two mounting blocks 48 extend below bottom panel 42 and are positioned on opposite sides of bottom panel 42. An aperture 50 extends through each of mounting blocks 48. Pivot pins 52 are mounted through apertures 29 and 50 in order to retain container 40 to frame 22. Pivot pins 52 allow container 40 to pivot or rotate relative to frame 22 in order to dump or unload materials held in container 40. After insertion, pivot pins 52 may be secured with a cotter key (not shown). Pivot pins 52 can be quickly removed and reinserted in order to allow a user to change container 40 to another container having a different type, size or shape.

In one embodiment, a support member 49 can extend downwardly from the bottom of container 40. Support member 49 can support container 40 when container 40 is in contact with the ground.

Two elongated spaced apart handles 60 are attached to rails 24. Each of the handles 60 has a distal end 62, a proximal or operator end 64 and a center section 66. A handhold is formed at the operator end 64. An operator manually grasps handholds 68 during the operation of wheelbarrow 20. The distal ends 62 are attached to the center section 30 of each rail 24 using a suitable fastener.

Two elongated arms 70 each have ends 72 and 74. End 72 is attached to the center section 66 of each handle 60 using a suitable fastener. End 74 is attached to each rail 24 towards proximal end 28 using a suitable fastener. A pair of rotatable stop posts 76 are attached each of the ends 72 of arms 70. Stop posts 76 are attached to ends 72 using a pin 78 (see FIG. 6). Stop posts 76 can be rotated to a first position where stop posts 76 extend over two of container side panels 42 thereby preventing pivoting of container 40. Stop posts 76 can be rotated to a second position where stop posts 76 do not extend over the container side panels 42 thereby allowing container 40 to rotate and pivot about pivot pins 52.

A stabilizing assembly 80 is coupled to wheelbarrow 50. Stabilizing assembly 80 permits wheelbarrow 50 to be unloaded in several configurations and orientations. Stabilizing assembly 80 includes two elongated spaced apart adjustable legs 82 and a lock mechanism 110. Each of the adjustable legs 82 has a distal end 84, a proximal end 86 and a center section 88. A hole 89 is defined in leg 82 towards distal end 84 and a series of linear spatially aligned apertures 90 are defined toward and edge of center section 88. An elongated slot 92 is defined in the center section 88 slightly spaced from apertures 90. A post 94 is mounted to each of handles 60 and extends outwardly away from handle 60 and is received into slot 92. Post 94 can move in a reciprocating manner within slot 92.

The distal ends 84 of each of the legs 82 are rotatably coupled to rails 26 and a connecting beam 100 by a pin 96. The connecting beam 100 has a proximal end 102 and a distal end 104. Axle 34 extends through proximal end 102 and retains proximal end 102 to rail end 28. Pin 96 couples the distal end 84 of leg 82 to beam distal end 104 and allows leg 82 to pivot relative to beam 100.

Figure 5A:
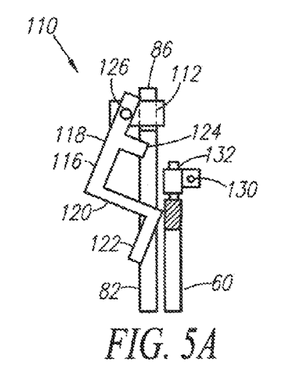
FIG. 5A illustrates an enlarged rear view of a lock mechanism in an unlocked position according to example embodiments.
Figure 5B:
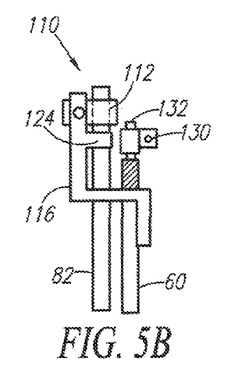
FIG. 5B illustrates an enlarged rear view of a lock mechanism in a locked position according to example embodiments.
Figure 5C:
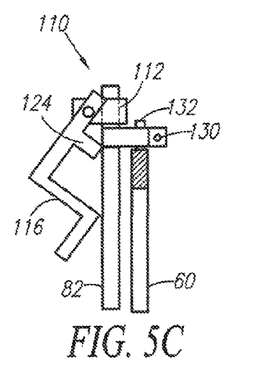
FIG. 5C illustrates an enlarged rear view of a lock mechanism in an unlocked position with the cam engaged according to example embodiments.

With additional reference to FIGS. 5A-5C, details of the lock mechanism 110 are illustrated. The lock mechanism 110 is mounted at the proximal ends 86 of legs 82. Lock mechanism 110 comprises a pair of rectangular shaped collars 112 that each has a rectangular shaped passage 114. Two apertures 115 are defined through collar 112. Collar 112 is attached to leg 82 such that the proximal end 86 extends through passage 114. Collar 112 can slide along leg 82. Locking pins 136 are inserted through apertures 115 and into respective corresponding juxtaposed apertures 90 in legs 82. Locking pins 136 fix collars 112 in a position along the length of legs 82.

A bracket 116 is attached to collar 112. Bracket 116 is formed by joined bars 118, 120 and 122. A post 124 extends perpendicularly away from bar 118 near the center of bar 118. One end of bar 118 is attached to collar 112 by a pin 126. Bracket 116 pivots about pin 126 relative to the collar 112.

A cam 130 is retained and mounted on a shaft 132 that is fixed to handle 60. Shaft 132 extends perpendicularly away from near the center of handle 60. Cam 130 can be manually rotated by a user about shaft 132.

Bracket 116 can be moved by the wheelbarrow operator to a first position as shown in FIG. 5A where bracket 116 is not engaged with handle 60 and handle 60 can move relative to leg 82. Bracket 116 can also be moved by the wheelbarrow operator to a second position as shown in FIG. 5B where bar 120 of the bracket 116 is engaged with handle 60 when the operator presses downwardly on handle 60. Referring to FIG. 5C, cam 130 can be rotated by the operator toward the center of handles 60 and into abutting relationship with post 124 thereby preventing bracket 116 from being engaged with handle 60.

Turning back to FIG. 1, leg stop pins 140 are inserted into hole 89 and extend under handle 60. Leg stop pins 140 support legs 82 and are used to release the legs during unloading of the wheelbarrow. Safety pins 142 are inserted into one of the apertures 90 that are aligned with an adjacent aperture 67 in handle 60. Safety pins 140 provide a secondary retention mechanism to hold legs 82 to handles 60 when they are inserted by the operator.

FIG. 2 illustrates a side view of the wheelbarrow 20 in a raised position for transporting according to example embodiments. Wheelbarrow 20 can be transported by an operator manually grasping handholds 68 and pressing downwardly on handles 60 causing frame 22 to pivot about axle 34 thereby raising wheelbarrow front end 20A and frame end 26 off of the ground. The operator can now push wheelbarrow 20 in the desired direction of forward movement causing rolling movement of wheelbarrow 20 on wheels 32.

Figures 3, 4:
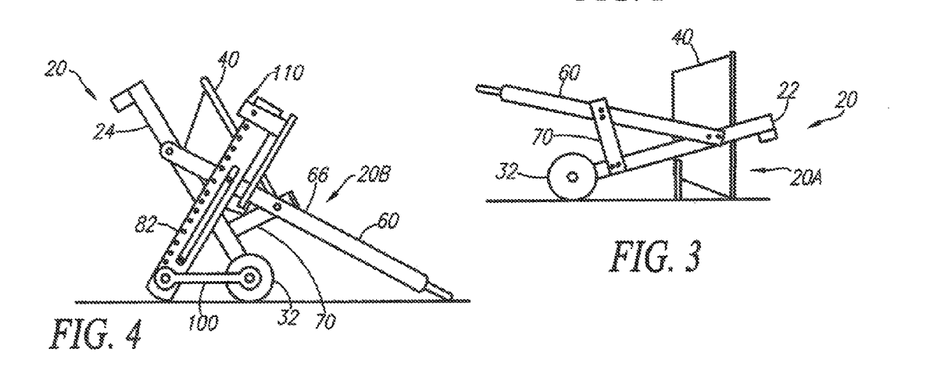
FIG. 3 illustrates a side view of the wheelbarrow of FIG. 1 configured in a position to unload contents of the wheelbarrow at the end opposite the operator according to example embodiments.
FIG. 4 illustrates a side view of the wheelbarrow of FIG. 1 configured in a position to unload contents of the wheelbarrow at the operator end according to example embodiments.

FIG. 3 illustrates a side view of wheelbarrow 20 configured in a position to unload contents of the wheelbarrow at the front end 20A according to example embodiments. Wheelbarrow 20 can be unloaded at the front end 20A in the following sequence. First, the operator moves the wheelbarrow and its contents to a desired position and releases the handles 60 leaving the wheelbarrow 20 in the loading position.

With additional reference to FIG. 1, the stop posts 76 are rotated such that the stop posts 76 do not extend over the container side panels 42 thereby allowing container 40 to rotate and pivot in a forward direction toward end 20A about pivot pins 52. As container 40 reaches a vertical alignment, the contents of container 40 will be emptied.

Container 40 can be returned to a loading position by the operator lifting on handles 60 such that container 40 pivots back to the loading position. The container 40 is then locked to handles 60 by the rotation of stop posts 76 over two of container side panels 42 thereby preventing pivoting of container 40.

FIG. 4 illustrates a side view of the wheelbarrow 20 configured in a position to unload contents of the wheelbarrow at the rear or operator end 20B according to example embodiments. Wheelbarrow 20 can be unloaded at the rear end 20B in the following sequence. First, the operator moves the wheelbarrow 20 and its contents to a desired position and releases the handles 60, leaving wheelbarrow 20 in the loading position.

With additional reference to FIG. 1, lock pins 136 are removed and the collars 112 are positioned along legs 82 to a selected container height position. The lock pins 136 are then reinserted through apertures 115 and into respective corresponding juxtaposed apertures 90 in legs 82. The leg stop pins 140 are removed from hole 89 the safety pins 142 are removed from the apertures 90. With pins 140 and 142 removed, the legs 82 will rotate such that distal end 84 is in contact with the ground.

Next, the operator manually grasps handholds 68 and presses downwardly on handles 60 causing handles 60 to move such that pins 94 slide from the bottom end of slot 92 to the upper end of slot 92. Eventually, the lock mechanism bracket 116 will snap into position under handles 60 such that bar 120 (FIG. 5B) is in contact with handle 60. The operator releases the handles 60 and inserts the safety pins 142 into one of the apertures 90 that are aligned with an adjacent aperture 67 in handle 60.

The stop posts 76 are rotated such that the stop posts 76 do not extend over the container side panels 42 thereby allowing container 40 to rotate and pivot in a rearward direction toward end 20B about pivot pins 52. As container 40 reaches a vertical alignment, the contents of container 40 will be emptied.

Wheelbarrow 20 can then be returned to the loading position by removing the safety pins from the apertures 90 and the operator pressing downwardly on handles 60 releasing pressure on legs 82. With the leg pressure released, the lock mechanism brackets 116 can be rotated out from under handles 60 and cams 130 are rotated so as to be positioned under legs 82.

The operator lifts on handles 60 causing handles 60 to move such that pins 94 slide from the upper end of slot 92 to the bottom end of slot 92. At the same time, the container 40 pivots back to the loading position. The container 40 is then locked to handles 60 by the rotation of stop posts 76 over two of container side panels 42 thereby preventing pivoting of container 40.

Figure 6:
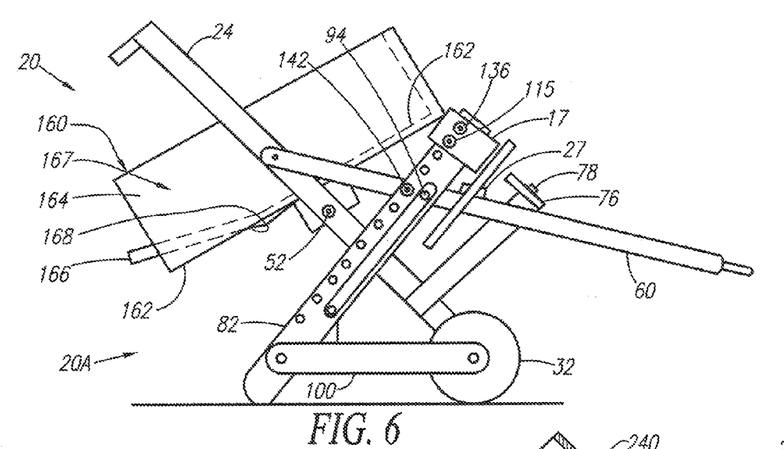
FIG. 6 illustrates a side view of the wheelbarrow of FIG. 1 with an alternative container embodiment and configured in a position to unload contents of the wheelbarrow at the end opposite the operator according to example embodiments.

FIG. 6 illustrates a wheelbarrow 20 with an alternative container 160 that is configured in a position to unload contents of the wheelbarrow at the front end 20A opposite the operator according to example embodiments. Container 160 comprises a bottom panel 162, three side panels 164 that are perpendicular to bottom panel 162 and a door 166. Bottom panel 162, side panels 164 and door 166 define a material holding cavity 167. A hinge 168 connects door 166 to bottom panel 162 and allows door 166 to be pivoted in order to empty the contents of container 160.

Wheelbarrow 20 with container 160 can be raised in the following sequence. First, the operator moves the wheelbarrow and its contents to a desired position and releases the handles 60, leaving wheelbarrow 20 in the loading position.

With additional reference to FIG. 1, lock pins 136 are removed and the collars 112 are positioned along legs 82 to a selected container height position. The lock pins 136 are then reinserted through apertures 115 and into respective corresponding juxtaposed apertures 90 in legs 82. The leg stop pins 140 are removed from hole 89 the safety pins 142 are removed from the apertures 90. With pins 140 and 142 removed, the legs 82 will rotate such that distal end 84 is in contact with the ground.

Next, the operator manually grasps handholds 68 and presses downwardly on handles 60 causing handles 60 to move such that pins 94 slide from the bottom end of slot 92 to the upper end of slot 92. Eventually, the lock mechanism bracket 116 will snap into position under handles 60 such that bar 120 (FIG. 5B) is in contact with handle 60. The operator releases the handles 60 and inserts the safety pins 142 into one of the apertures 90 that are aligned with an adjacent aperture 67 in handle 60. Door 166 is now released and allowed to open. The stop posts 76 are rotated such that the stop posts 76 do not extend over the container side panels 42 thereby allowing container 160 to rotate and pivot in a forward direction toward end 20A about pivot pins 52. As container 160 reaches a vertical alignment, the contents of container 160 will be emptied.

Figure 7:
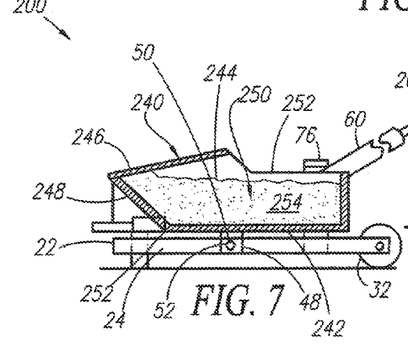
FIG. 7 illustrates a side view of an alternative embodiment of a wheelbarrow for use with concrete in a loading position according to example embodiments.

FIG. 7 illustrates a side view of an alternative embodiment of a wheelbarrow 200 for use with concrete in a loading position according to example embodiments. Wheelbarrow 200 is similar to wheelbarrow 20 except that the stabilizing assembly 80 has been omitted. Wheelbarrow 200 also has a different container 40 that is configured to hold concrete 254. Container 240 is mounted to frame 22. Container 240 is formed from a planar bottom panel 242, three generally planar side panels 244, an angled top panel 246 and a door 248. Panels 242, 244 and 246 are connected to each other and define a cavity 250 and an opening 252 for receiving the concrete 254. The door 248 is mounted via a hinge 252 to the bottom panel 242 for rotational movement. Door 248 can move between an open and closed position. Door 248 is held in a closed position by a door lock (not shown).

Two mounting blocks 48 extend below bottom panel 242 and are positioned on opposite sides of bottom panel 242. An aperture 50 extends through each of mounting blocks 248. Pivot pins 52 are mounted through apertures 29 (FIG. 1) and 50 in order to retain container 240 to frame 22. Pivot pins 52 allow container 240 to pivot or rotate relative to frame 22 in order to dump or unload materials held in container 40.

Figure 8:
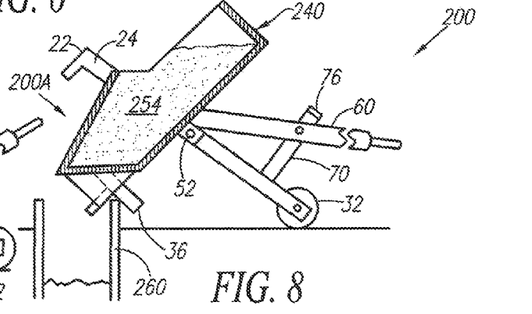
FIG. 8 illustrates a side view of the wheelbarrow of FIG. 7 being raised according to example embodiments.

FIG. 8 illustrates wheelbarrow 200 being moved to an unloading position above a concrete form 260. The operator can push wheelbarrow 200 in a forward direction towards concrete form 260 until support foot 36 engages and rests on the top peripheral edge of concrete form 260.

The stop posts 76 are rotated such that the stop posts do not extend over the container side panels 242 thereby allowing container 240 to rotate and pivot in a forward direction toward end 200A about pivot pins 52.

Figure 9:
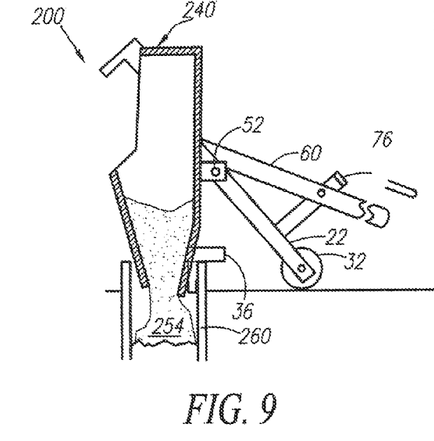
FIG. 9 illustrates a side view of the wheelbarrow of FIG. 7 configured in a position to unload contents of the wheelbarrow at the end opposite the operator into a concrete form according to example embodiments.

FIG. 9 illustrates wheelbarrow 200 unloading concrete 254 into a concrete form 260. With container 240 positioned above the concrete form 260, door 248 is opened allowing concrete 254 to flow from container 240 into concrete form 260.

Figure 10:
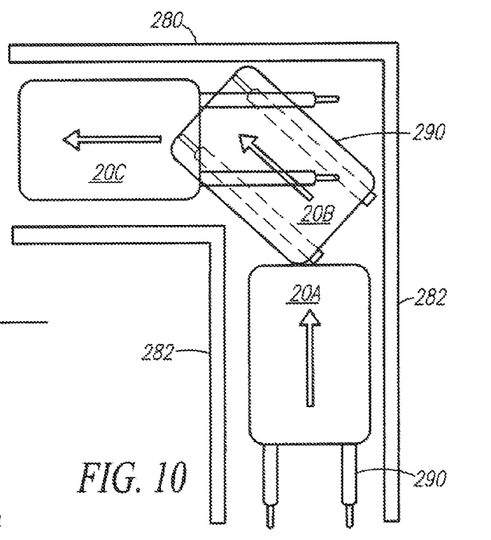
FIG. 10 illustrates a top view of a method of maneuvering the wheelbarrow of FIG. 1 in a confined space according to example embodiments.
Figure 11A:
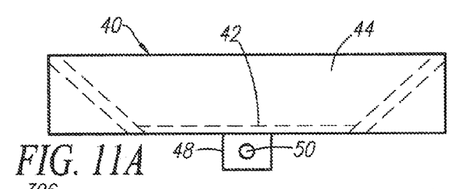
FIG. 11A illustrates a side view of a container according to example embodiments.
Figure 11B:
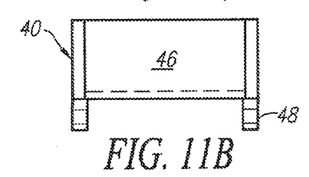
FIG. 11B illustrates a front view of the container of FIG. 11A according to example embodiments.

FIG. 10 illustrates a method of maneuvering the wheelbarrow 20 of FIG. 1 in a confined space according to example embodiments. A confined space 280 is defined between walls 282. The width between walls 282 can be slightly larger than the width of wheelbarrow 20. Folding handles 290 can be mounted to wheelbarrow 20 in order to allow wheelbarrow to be maneuvered around a corner of the confined space 280.

Wheelbarrow 20A is shown with the folding handles 290 in an unfolded position. In order to turn the wheelbarrow around the corner, the handles 290 are folded as shown by wheelbarrow 20B and the wheelbarrow moved forward. The folding handles 290 are then moved to the unfolded position as illustrated by wheelbarrow 20C in order to continue movement of the wheelbarrow.

Figure 12A:
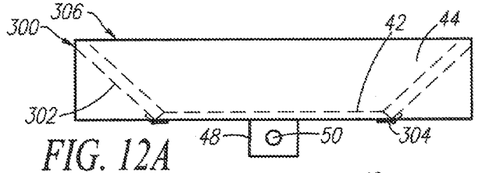
FIG. 12A illustrates a side view of a container with closed doors according to example embodiments.
Figure 12B:
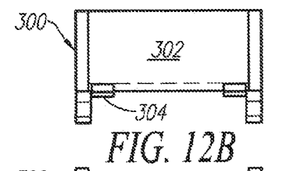
FIG. 12B illustrates a front view of the container of FIG. 12A according to example embodiments.
Figure 13A:
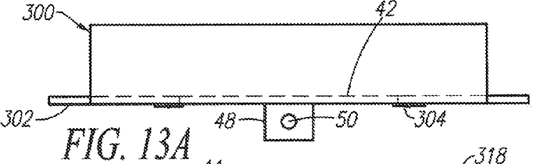
FIG. 13A illustrates a side view of the container of FIG. 12A with the doors in an open position according to example embodiments.
Figure 13B:
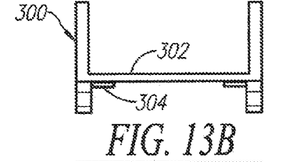
FIG. 13B illustrates a front view of the container of FIG. 13A according to example embodiments.

FIGS. 12A and 12B illustrate an alternative embodiment of a container 300 with doors 302 according to example embodiments. Container 300 is formed from a planar bottom panel 42, two opposed generally planar side panels 44 and two opposed front and rear doors 302. Panels 42 and 44 are connected to each other and define a cavity 306. Front and rear doors 302 are mounted via a hinge 304 to the bottom panel 42 for rotational movement. Doors 302 can move approximately 45 degrees between an open and a closed position. Doors 302 are held in a closed position by a door lock (not shown). Two mounting blocks 48 extend below bottom panel 42 and are positioned on opposite sides of bottom panel 42. An aperture 50 extends through each of mounting blocks 48. FIGS. 13A and 13B illustrate container 300 with the doors 302 in an open position. Doors 302 allow materials to be unloaded from either the front end or the back end of the wheelbarrow.

Figure 14A:
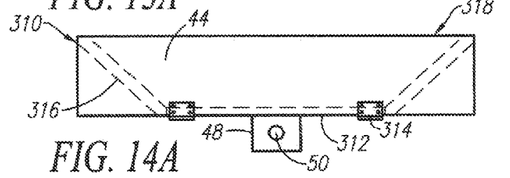
FIG. 14A illustrates a side view of another embodiment of a container with closed bottom doors according to example embodiments.
Figure 14B:
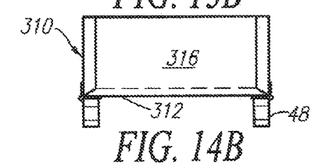
FIG. 14B illustrates a front view of the container of FIG. 14A according to example embodiments.
Figure 15A:
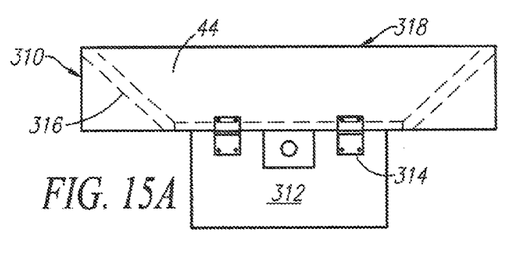
FIG. 15A illustrates a side view of the container of FIG. 14A with open bottom doors according to example embodiments.
Figure 15B:
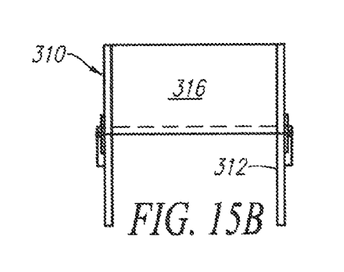
FIG. 15B illustrates a front view of the container of FIG. 15A according to example embodiments.

FIGS. 14A and 14B illustrate another embodiment of a container 310 with doors 312 according to example embodiments. Container 310 is formed from two opposed angled generally planar end panels 316, two opposed generally planar side panels 44 and two bottom doors 312. Panels 316 and 44 are connected to each other and define a cavity 318. Bottom doors 312 are arranged side by side and are mounted via a hinge 314 to a respective end panel 316. Doors 312 can move between an open and a closed position. Doors 312 are held in a closed position by a door lock (not shown). Two mounting blocks 48 extend below bottom panel 42 and are positioned on opposite sides of bottom panel 42. An aperture 50 extends through each of mounting blocks 48. FIGS. 15A and 15B illustrate container 310 with the doors 312 in an open position. Doors 312 allow materials to be unloaded from the bottom of the wheelbarrow.

Figure 16A:
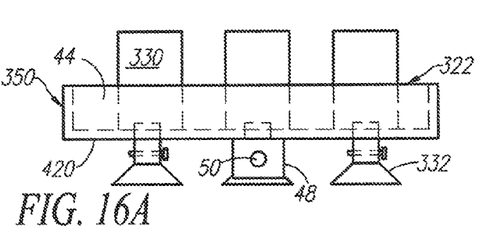
FIG. 16A illustrates a side view of another embodiment of a container with several liquid storage tanks according to example embodiments.
Figure 16B:
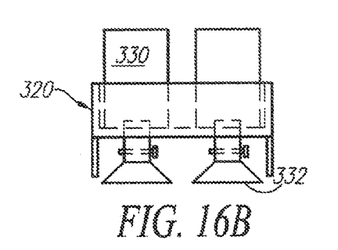
FIG. 16B illustrates a front view of the container of FIG. 16A according to example embodiments.

FIGS. 16A and 16B illustrate another embodiment of a container 320 with several liquid storage tanks 330 according to example embodiments. Container 320 is formed from a bottom panel 42, two opposed planar end panels 44 and two opposed planar side panels 44. Panels 42 and 44 are connected to each other and define a cavity 322. Liquid storage tanks 330 are mounted in cavity 322 and rest on bottom panel 42. Liquid storage tanks 330 have a nozzle 332 that extend below bottom panel 42 and point downwardly. Liquid storage tanks 330 allow liquid products to be applied from the wheelbarrow.

Figure 17A:
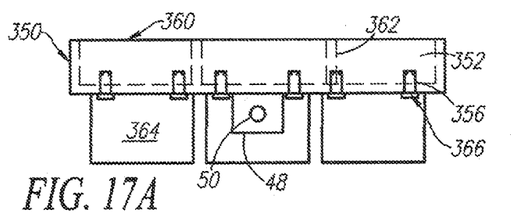
FIG. 17A illustrates a side view of an additional embodiment of a container with several storage compartments according to example embodiments.
Figure 17B:
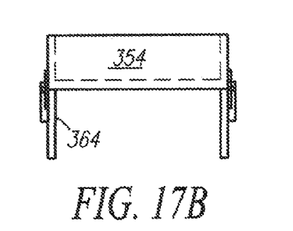
FIG. 17B illustrates a front view of the container of FIG. 17A according to example embodiments.

FIGS. 17A and 17B illustrate an additional embodiment of a container 350 with several storage compartments 360 according to example embodiments. Container 350 is formed from two opposed generally planar side panels 352, two opposed generally planar end panels 354 and a bottom panel 356. Panels 352, 354 and 356 are connected to each other. A wall 362 extends perpendicularly upwards from the bottom panel 356 and separates each of three compartments 360.

Three bottom doors 364 are arranged side by side and are mounted via a hinge 366 to bottom panel 356. Doors 364 can move between an open and a closed position. In FIGS. 17A and 17B, doors 364 are shown in an open position. Doors 364 are held in a closed position by a door lock (not shown). Two mounting blocks 48 extend below bottom panel 356 and are positioned on opposite sides of bottom panel 356. An aperture 50 extends through each of mounting blocks 48. FIGS. 15A and 15B illustrate container 310 with the doors 312 in an open position. Doors 312 allow materials to be unloaded from the bottom of the wheelbarrow.

Figure 18A:
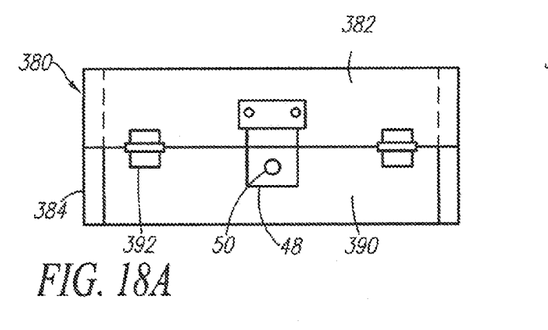
FIG. 18A illustrates a side view of one more embodiment of a container with adjustable doors according to example embodiments.
Figure 18B:
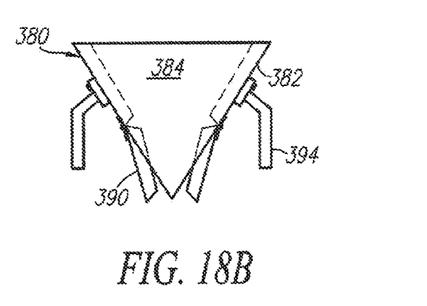
FIG. 18B illustrates a front view of the container of FIG. 18A according to example embodiments.

FIGS. 18A and 18B illustrate one more embodiment of a container 380 with adjustable doors 390 according to example embodiments. Container 380 is formed from two angled opposed generally planar side panels 382 and two opposed triangular shaped planar end panels 384. Panels 382 and 384 are connected to each other. A door 390 is mounted to the bottom portion of each side panel 382 by a hinge 392. Two mounting blocks 48 extend from side panels 382 and are positioned on opposite sides of container 380. An aperture 50 extends through each of mounting blocks 48. The opening of doors 390 can be controlled by a lever 394 in order to regulate the flow of material exiting container 380.

Figure 19A:
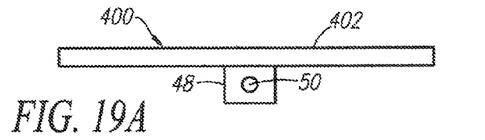
FIG. 19A illustrates a side view of another embodiment of a container with a flat bed according to example embodiments.
Figure 19B:
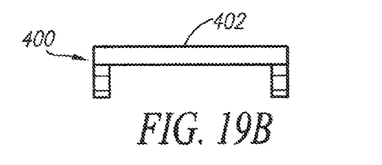
FIG. 19B illustrates a front view of the container of FIG. 19A according to example embodiments.

FIGS. 19A and 19B illustrate yet another embodiment of a container 400 with a flat bed 402 according to example embodiments. Container 400 is formed from a planar bed panel 402. Two mounting blocks 48 extend below bed 402 and are positioned on opposite sides of bed 402. An aperture 50 extends through each of mounting blocks 48.

Figure 20:
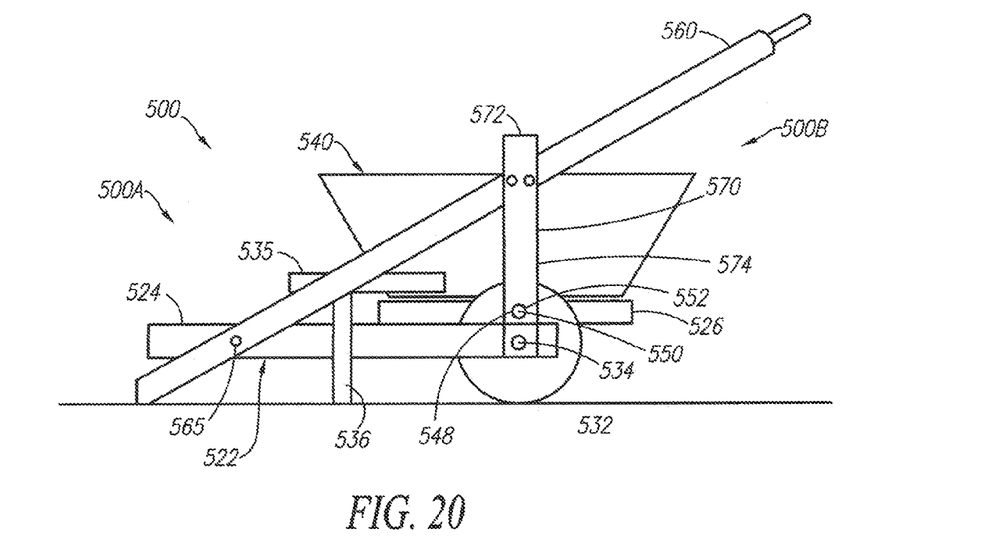
FIG. 20 illustrates a side view of an alternative embodiment of a wheelbarrow with a sliding container according to example embodiments.

FIG. 20 illustrates a side view of an alternative embodiment of a wheelbarrow with a sliding container according to example embodiments. With reference to FIG. 20, wheelbarrow 500 includes a static frame 522 with two elongated spaced apart rails 524. A moveable frame 526 is movably coupled to rails 524. Moveable frame 526 can slide along rails 524 in a horizontal direction towards wheelbarrow front end 500A or towards wheelbarrow back end 500B. A wheel 532 is attached to an axle 534 that is mounted through an aperture in each rail proximal end. Wheels 532 rotate about axles 534.

A container 540 is mounted to moveable frame 526. Container 540 can hold a wide variety of materials to be transported such as concrete, dirt, building materials and other materials. Two mounting blocks 548 extend below container 540 and are positioned on opposite sides of container 540. An aperture 550 extends through each of mounting blocks 548. Pivot pins 552 are mounted through apertures 550 and apertures in moveable frame 526 (not shown) in order to retain container 540 to moveable frame 526.

Pivot pins 552 allow container 540 to pivot or rotate relative to moveable frame 526 in order to dump or unload materials held in container 540. After insertion, pivot pins 552 may be secured with a cotter key (not shown). Pivot pins 552 can be quickly removed and reinserted in order to allow a user to change container 540 to another container having a different type, size or shape.

Two spaced apart container arms 535 are mounted to opposite sides of container 540 and extend away from container 540 and are generally parallel to rails 524. Container legs 536 are mounted to arms 535 and extend perpendicularly downward. Container legs 536 can contact the ground and support container 540.

Two elongated spaced apart handles 560 are attached to rails 524. A pin 565 couples a distal end of one handle 560 to one of rails 524. Two elongated arms 570 each have ends 572 and 574. End 572 is attached a center section of handle 560 using a suitable fastener. End 574 is attached to rail 524 by axle 534.

During use, wheelbarrow 500 allows and operator to vary the position of container 540 relative to the axis of wheel 532 by sliding container 540 and moveable frame 526 along rails 524 in a horizontal direction towards wheelbarrow front end 500A or towards wheelbarrow back end 500B.

Figure 21A:
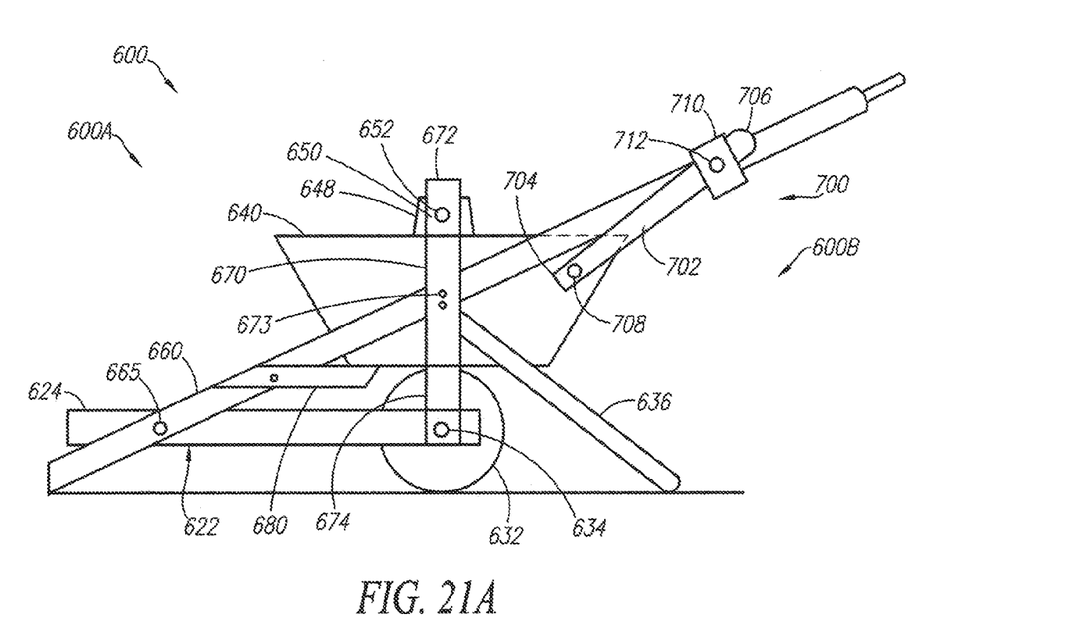
FIG. 21A illustrates a side view of another embodiment of a wheelbarrow in a loading position with a container pivot axis fixed over the wheels and above the container according to example embodiments.

FIG. 21A illustrates a side view of another embodiment of a wheelbarrow in a loading position with a container pivot axis fixed over the wheels and above the container according to example embodiments. With reference to FIG. 21A, wheelbarrow 600 includes a frame 622 with two elongated spaced apart rails 624. Wheelbarrow 600 has a wheelbarrow front end 600A and a wheelbarrow back end 600B. A wheel 632 is attached to an axle 634 that is mounted through an aperture in each rail proximal end. Wheels 632 rotate about axles 634.

Two elongated spaced apart handles 660 are attached to rails 624. A pin 665 couples a distal end of one handle 660 to one of rails 624. Two elongated arms 670 each have ends 672 and 674. A center section of handle 660 is attached to a center section of arm 670 using a suitable fastener 673. End 674 is attached to rail 624 by axle 634.

A container 640 is mounted to arm 670 towards end 672. Container 640 can hold a wide variety of materials to be transported such as concrete, dirt, building materials and other materials. Two mounting blocks 648 extend above container 640 and are positioned on opposite sides of container 640. An aperture 650 extends through each of mounting blocks 648. Pivot pins 652 are mounted through apertures 650 and apertures in arm 670 (not shown) in order to retain container 640 to arm 670.

Pivot pins 652 allow container 640 to pivot or rotate relative to arm 670 in order to dump or unload materials held in container 640. After insertion, pivot pins 652 may be secured with a cotter key (not shown). Pivot pins 652 can be quickly removed and reinserted in order to allow a user to change container 640 to another container having a different type, size or shape.

The suspension of container 640 from arms 670 by pivot pins 652 allows container 640 to be self-leveling as wheelbarrow 600 is moved along uneven surfaces. When wheelbarrow 600 is moved along a surface that slopes up or down, container 640 will pivot relative to frame 622 such that container 640 is always level.

Two spaced apart stop blocks 680 are mounted to inner sides of handles 660 and face each other. Stop blocks 680 have one end fixed to handles 660 and another end that abuts the bottom of container 640. Stop blocks 680 prevent the rotation of container 640 in one direction. A retractable leg 636 is mounted to each arm 670. One end of retractable leg 636 is pivotally attached to the junction of arm 570 and handle 660 and the other end of retractable leg 636 can be move between a position parallel to handle 660 and a position in contact with the ground. When retractable leg 636 is engaged with the ground, retractable leg 636 serves to stabilize wheelbarrow 600.

An unloading mechanism 700 is coupled to handle 660 to facilitate unloading of container 640. Unloading mechanism 700 comprises two elongated shafts 702 that each have a distal end 704 and a proximal end 706. Shafts 702 are diametrically opposed to each other interior to the handles 660. Each distal end 704 is mounted for rotating movement to a side of container 640 by a pivot pin 708. The proximal ends 706 are each coupled to a collar 710. Each collar 710 is mounted over and surrounds a handle 660. Collar 710 can slide along handle 660. A bar 712 is mounted between and perpendicular to shafts 702. The ends of bar 712 extend through one side of collar 710 and through shaft 702. A fastener (not shown) can retain bar 712 to shaft 702.

Figure 21B:
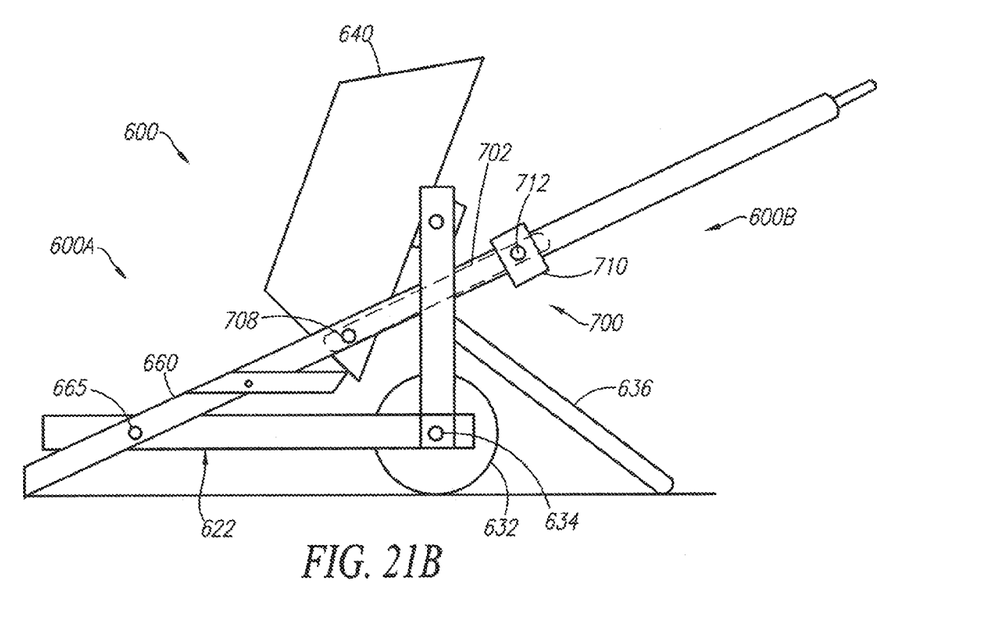
FIG. 21B illustrates a side view of the wheelbarrow of FIG. 21A in an unloading position according to example embodiments.

During use, wheelbarrow 600 allows an operator to empty container 640 using unloading mechanism 700. A user grasps bar 712 and pushes on bar 712 towards end 600A causing collar 710 to slide along handle 660. At the same time, shaft 702 moves towards end 600A causing container 640 to rotate in a clockwise direction about pivot pin 708. Continued pushing on bar 712 will eventually cause container 640 to move to a near vertical position where the contents of container 640 are unloaded as shown in FIG. 21B.

While preferred embodiments of the present invention have been described, it is to be understood that the embodiments described are illustrative only and the scope of the invention is to be defined solely by the appended claims when considered with a full range of equivalents, and modifications (e.g., protocols, hardware devices, software platforms etc.) thereto.

What is claimed is:

1. A wheelbarrow comprising:
   a frame;
   a container coupled to the frame;
   a pivoting mechanism for pivotally securing the container to the frame such that the container can be pivoted relative to the frame;
   a pair of handles having a first end and a second end, the second end attached to the frame;
   a pair of wheels coupled to the frame;
   a stabilizing assembly coupled between the handles and the frame, the stabilizing assembly selectively engaged during unloading of the wheelbarrow, wherein the stabilizing assembly comprises a pair of adjustable legs coupled between the handles and the frame; and
   a lock mechanism coupled to the legs for fixing a position of the legs, the lock mechanism comprises a slidable collar coupled to a second end of the legs by a first pin, and wherein the lock mechanism further comprises a bracket coupled to the collar and a cam mounted to one of the handles.

2. The wheelbarrow of claim 1 further comprising an arm coupled between the handles and the frame.

3. The wheelbarrow of claim 1 further comprising a connecting beam coupled between an axle and one end of the legs.

4. The wheelbarrow of claim 3, wherein each of the legs includes a slot and a plurality of apertures.

5. The wheelbarrow of claim 2, wherein each of the handles has a post that extends into the slot.

6. A wheelbarrow comprising:
   a frame;
   a container coupled to the frame;
   a pair of handles having a first end and a second end, the second end of the pair of handles attached to the frame;
   a pair of wheels coupled to the frame;
   a pair of adjustable legs coupled between the handles and the frame, wherein each of the legs have a first end and a second end, the first end of the legs coupled to the frame, wherein each of the legs further comprises a slot and a plurality of apertures, each of the handles having a post that extends into the slot; and
   a lock mechanism coupled to the second end of the legs for fixing a position of the legs, the adjustable legs deployed during unloading of the wheelbarrow, the lock mechanism comprises a slidable collar coupled to the second end of the legs by a first pin, and wherein the lock mechanism further comprises a bracket coupled to the collar and a cam mounted to one of the handles.

7. The wheelbarrow of claim 6 further comprising a second pin coupled between the handles and the frame.

8. The wheelbarrow of claim 6 further comprising a pivoting mechanism for pivotally securing the container to the frame such that the container can be pivoted relative to the frame.

* * * * *